(12) United States Patent
Ohhashi

(10) Patent No.: US 6,641,165 B2
(45) Date of Patent: Nov. 4, 2003

(54) AIR BELT APPARATUS

(75) Inventor: Kiyotaka Ohhashi, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/852,089

(22) Filed: May 10, 2001

(65) Prior Publication Data
US 2002/0000715 A1 Jan. 3, 2002

(30) Foreign Application Priority Data
May 11, 2000 (JP) .................................... 2000-138911

(51) Int. Cl.⁷ .............................................. B60R 21/18
(52) U.S. Cl. ................................... 280/733; 280/743.1
(58) Field of Search ............................. 280/733, 743.1; B60R 21/18

(56) References Cited

U.S. PATENT DOCUMENTS

| | | | |
|---|---|---|---|
| 3,841,654 A | * 10/1974 | Lewis ......................... | 280/733 |
| 3,975,258 A | 8/1976 | Fox ............................. | 280/733 |
| 5,288,104 A | * 2/1994 | Chen ........................... | 280/733 |
| 5,354,096 A | * 10/1994 | Tanaka et al. ............... | 280/733 |
| 5,385,367 A | * 1/1995 | Tanaka et al. ............... | 280/733 |
| 5,385,368 A | * 1/1995 | Bridge ........................ | 280/733 |
| 5,390,953 A | 2/1995 | Tanaka et al. ............... | 280/733 |
| 5,465,999 A | * 11/1995 | Tanaka et al. ............... | 280/733 |
| 5,474,326 A | * 12/1995 | Cho ............................. | 280/733 |
| 5,947,513 A | * 9/1999 | Lehto .......................... | 280/733 |
| 6,019,388 A | 2/2000 | Okazaki et al. ............. | 280/733 |
| 6,109,647 A | * 8/2000 | Akaba et al. ................ | 280/733 |
| 6,142,511 A | * 11/2000 | Lewis .......................... | 280/733 |
| 6,402,194 B1 | 6/2002 | Takeuchi ..................... | 280/733 |
| 6,419,263 B1 | 7/2002 | Büsgen et al. .............. | 280/733 |
| 2002/0000715 A1 | 1/2002 | Ohhashi ...................... | 280/733 |

FOREIGN PATENT DOCUMENTS

| | | |
|---|---|---|
| DE | 198-44-137 | 4/1999 |
| EP | 0 901 945 | 3/1999 |
| EP | 0 933 263 | 8/1999 |
| JP | 5-85301 | 4/1993 |
| JP | 06-072268 | 3/1994 |
| WO | WO 98/51542 | 11/1998 |

* cited by examiner

*Primary Examiner*—Paul N. Dickson
*Assistant Examiner*—Laura B. Rosenberg
(74) *Attorney, Agent, or Firm*—Foley & Lardner

(57) ABSTRACT

An air belt which is smoothly supported by an anchor, and is directly wound by a retractor is provided. The air belt includes a belt having a sheet-shaped single layer portion, a double layer portion having the shape of a flat, hollow tube, and a middle portion which is disposed between the single layer portion and the double layer portion. A bag is contained in the double layer portion. Both the bag and the belt are connected to the tongue at the ends thereof. The single layer portion of the belt is inserted through the anchor, and is connected to the seat belt retractor in a windable and extractable manner. The belt is manufactured by continuously and integrally forming the single layer portion, the middle portion, and the double layer portion with a woven or knit fabric. A weft may be inserted through the single layer portion.

12 Claims, 5 Drawing Sheets

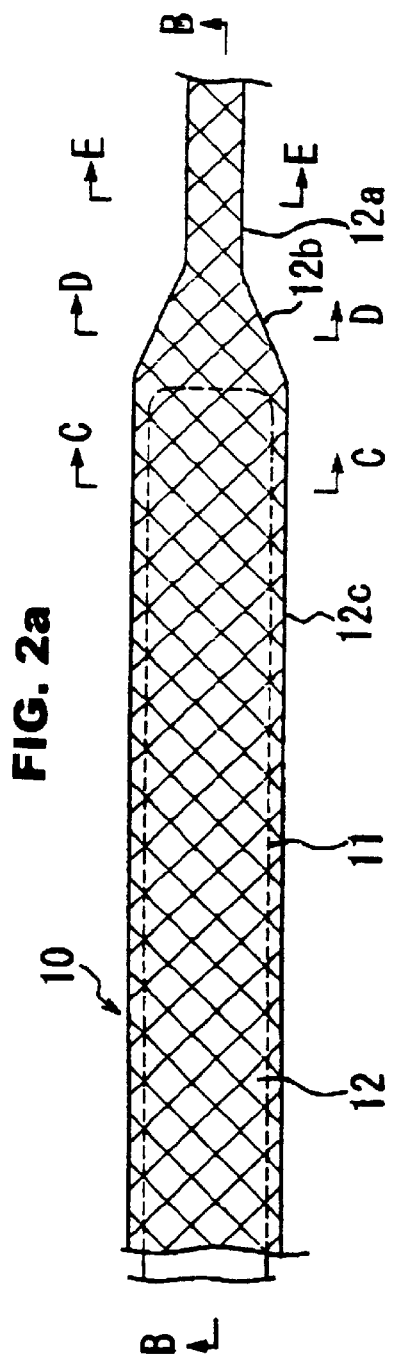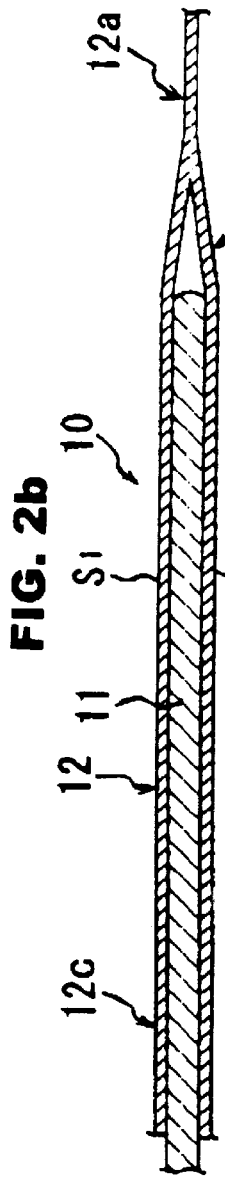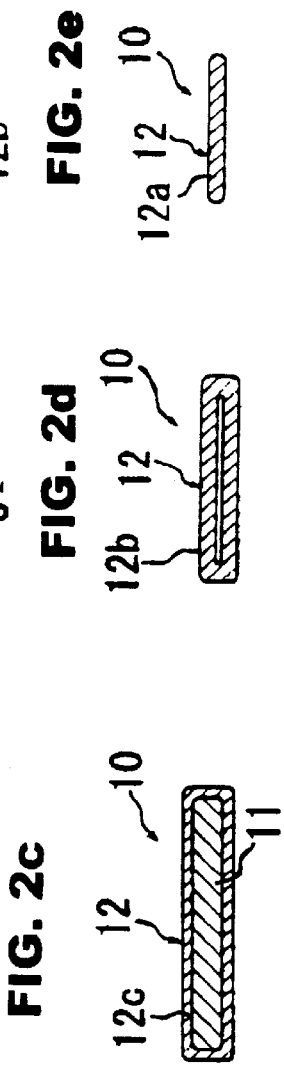

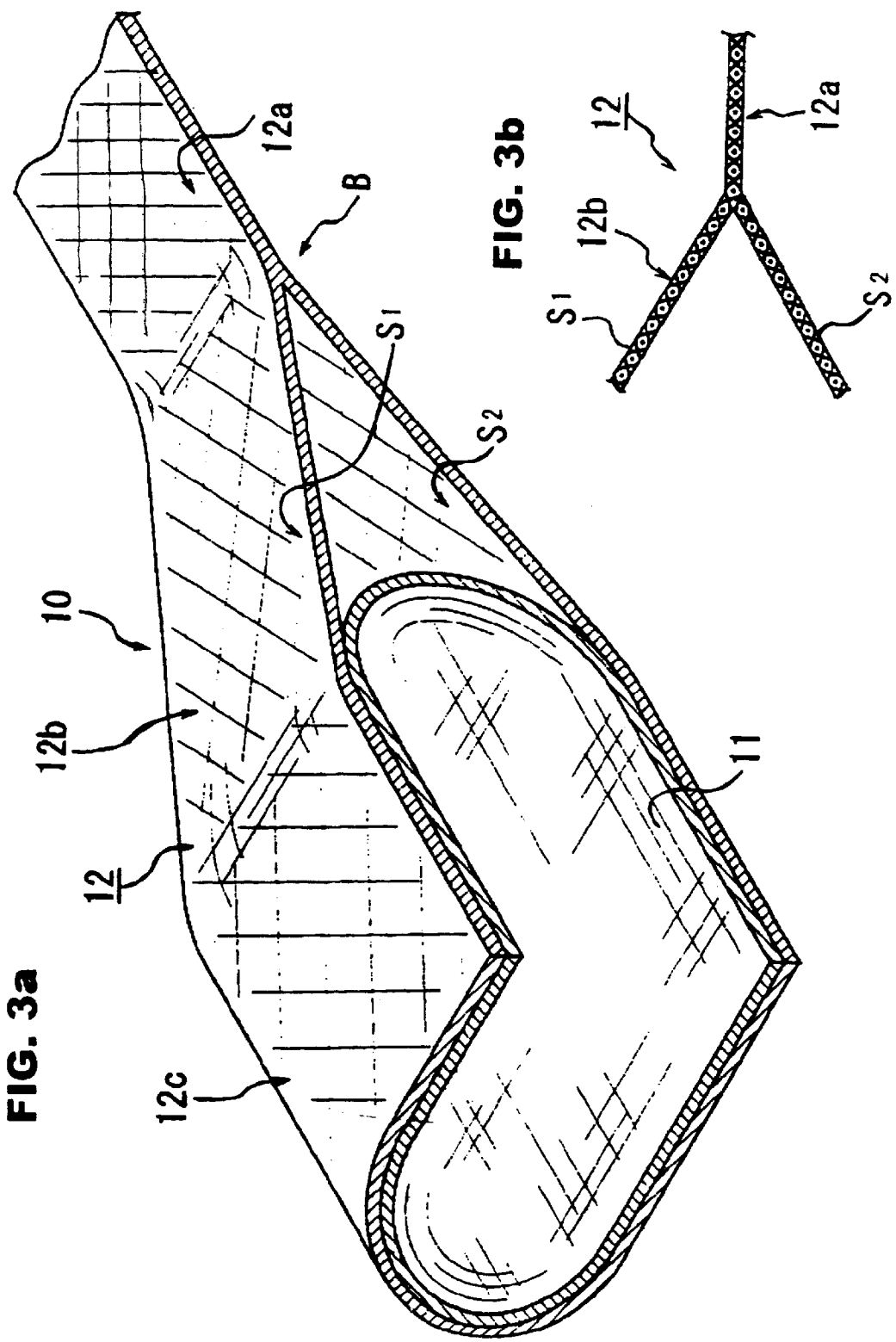

AIR BELT APPARATUS

BACKGROUND

The present invention relates to air belt apparatuses which protect occupants in a movable body such as a vehicle, etc., when the movable body collides, etc., and to air belts comprised therein. More specifically, the present invention relates to an air belt apparatus and to an air belt, in which a bag is expanded by a gas supplied by a gas generator.

An air belt apparatus of this type is disclosed in Japanese Unexamined Patent Application Publication No. 5-85301. FIG. 5 is a perspective view of the disclosed air belt apparatus.

This air belt apparatus 1 includes an air belt 2 which extends in an inclined manner from the right side to the left side of an occupant, a webbing 2a which is connected to the air belt 2 at an end thereof, a wrap belt 3 which extends from the right side to the left side of the occupant, a buckle 4 which is disposed on the floor portion, etc., of a vehicle body, a tongue 5 which is inserted into and engaged with the buckle 4 when the belt is fastened, and an anchor 6 which guides the webbing 2a.

The webbing 2a is constructed of normal belt material which is similar to the material used for typical, conventional seat belts, and is slidably inserted through the anchor 6. The other end of the webbing 2a is connected, in such a manner that the webbing 2a can be wound, to a seat belt retractor (ELR) 7 which is fixed to the vehicle body, and which is provided with an emergency locking mechanism.

The upper end of the air belt 2 is connected to the webbing 2a by sewing, etc., and the lower end thereof is connected to the tongue 5.

The wrap belt 3 is constructed of normal belt material which is similar to the material used for typical, conventional seat belts. One end of the wrap belt 3 is connected to a tongue 5, and the other end is connected to a seat belt retractor (ELR) 8, which is fixed to the vehicle body. The buckle 4 is connected to a gas generator 9 which generates a high-pressure gas when it is activated in an emergency situation, for example, when the vehicle is in a collision.

Both the tongue 5 and the buckle 4 include a passage through which the gas generated by the gas generator 9 passes to the air belt 2.

The air belt 2 is constructed of a wide, band-like shaped bag which is folded to make it thinner and which is enclosed by a cover. The thin, band-like shape of the air belt 2 is maintained in normal situations. The air belt apparatus 1 is used in a similar manner to a normal seat belt apparatus. When the vehicle collides, etc., and the gas generator 9 is activated, the air belt 2 inflates to the position indicated by a double-dotted chain line in FIG. 5 in order to protect the occupant.

In the above-described conventional air belt apparatus 1, the webbing 2a, which is connected to the air belt 2, is wound by the retractor 7. This arrangement is required because the air belt 2 cannot easily pass through the anchor 6 and the retractor 7 cannot easily wind the air belt 2 due to the relative thickness of the air belt 2 compared to the webbing 2a.

Accordingly, it is an object of the present invention to provide an air belt apparatus in which the webbing 2a is omitted, and in which a belt, which is integrally formed with an expanding portion of an air belt, can directly be inserted through an anchor and wound by a retractor.

SUMMARY OF THE INVENTION

According to the present invention an air belt is provided. The air belt includes a belt, one half thereof in the lateral direction being formed as a hollow expandable portion which is able to expand, and the other half thereof in the lateral direction being formed as a non-expanding portion. The air belt further includes a bag which is contained in the expandable portion of said belt. The bag is configured to receive gas, which is injected so as to expand the air belt. In addition, the belt is constructed by continuously and integrally forming the expandable portion and the non-expanding portion with a woven or knit fabric, and wefts are inserted through the non-expanding portion.

The non-expanding portion of the air belt is solid. As a result, the non-expanding portion smoothly slides through an anchor, is smoothly wound by a retractor, and is smoothly extracted. In addition, since the wefts are inserted through the non-expanding portion, the non-expanding portion does not expand in the lateral direction when it is wound by the retractor. Accordingly, the non-expanding portion is wound by the retractor in a smooth manner.

In an air belt apparatus according to the present invention, the expansion of the air belt is realized by a gas generator. The air belt apparatus may further include a tongue to which an end of the air belt is connected and a retractor which winds the air belt from the other end thereof, and is installed inside a vehicle, etc.

It is to be understood that both the foregoing general description and the following detailed description are exemplary and explanatory only and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

FIG. 2(a) is a plan view of an air belt according to the present invention.

2(b) to 2(e) are enlarged sectional views of the air belt shown in FIG. 2(a), which are cut along lines B—B, C—C, D—D, E—E, respectively.

FIG. 3(a) is a sectional view of an air belt according to the present invention in an expanded state.

FIG. 3(b) is a sectional view of a part shown by B in FIG. 3(a).

Figure 1B:
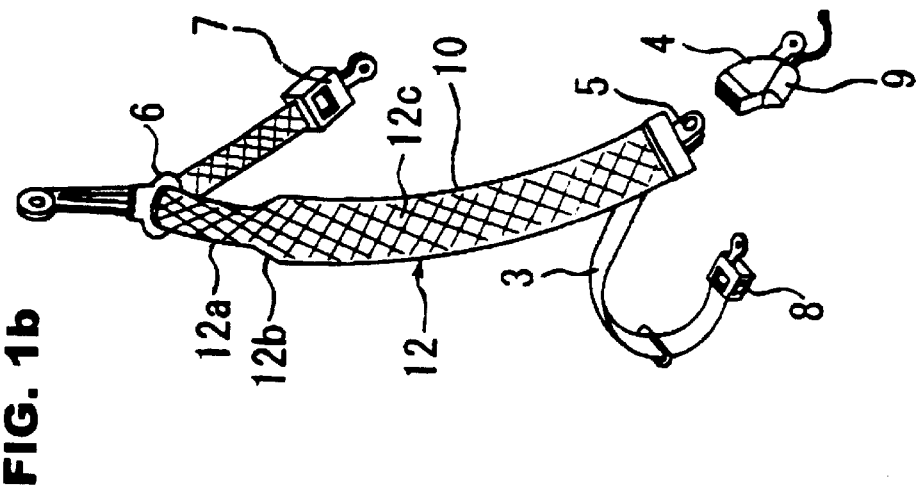
FIG. 1(b) is a perspective view of the air belt apparatus of FIG. 1(a).
Figure 1A:
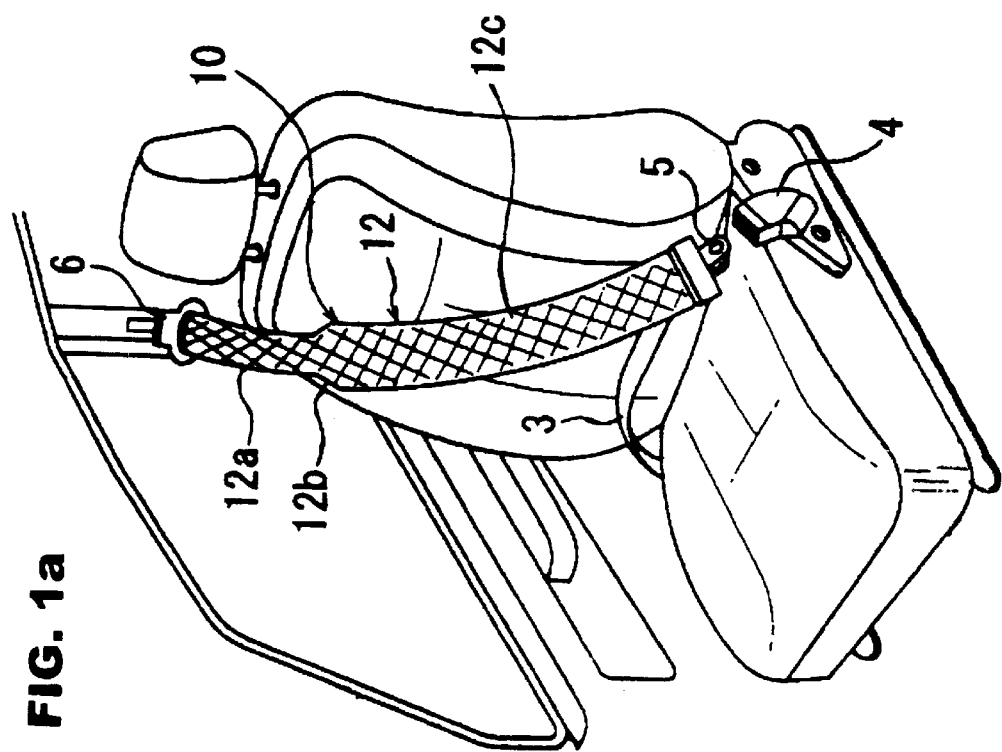
FIG. 1(a) is a perspective view of an interior of a vehicle to which an air belt apparatus according to the present invention is mounted.
Figure 4:
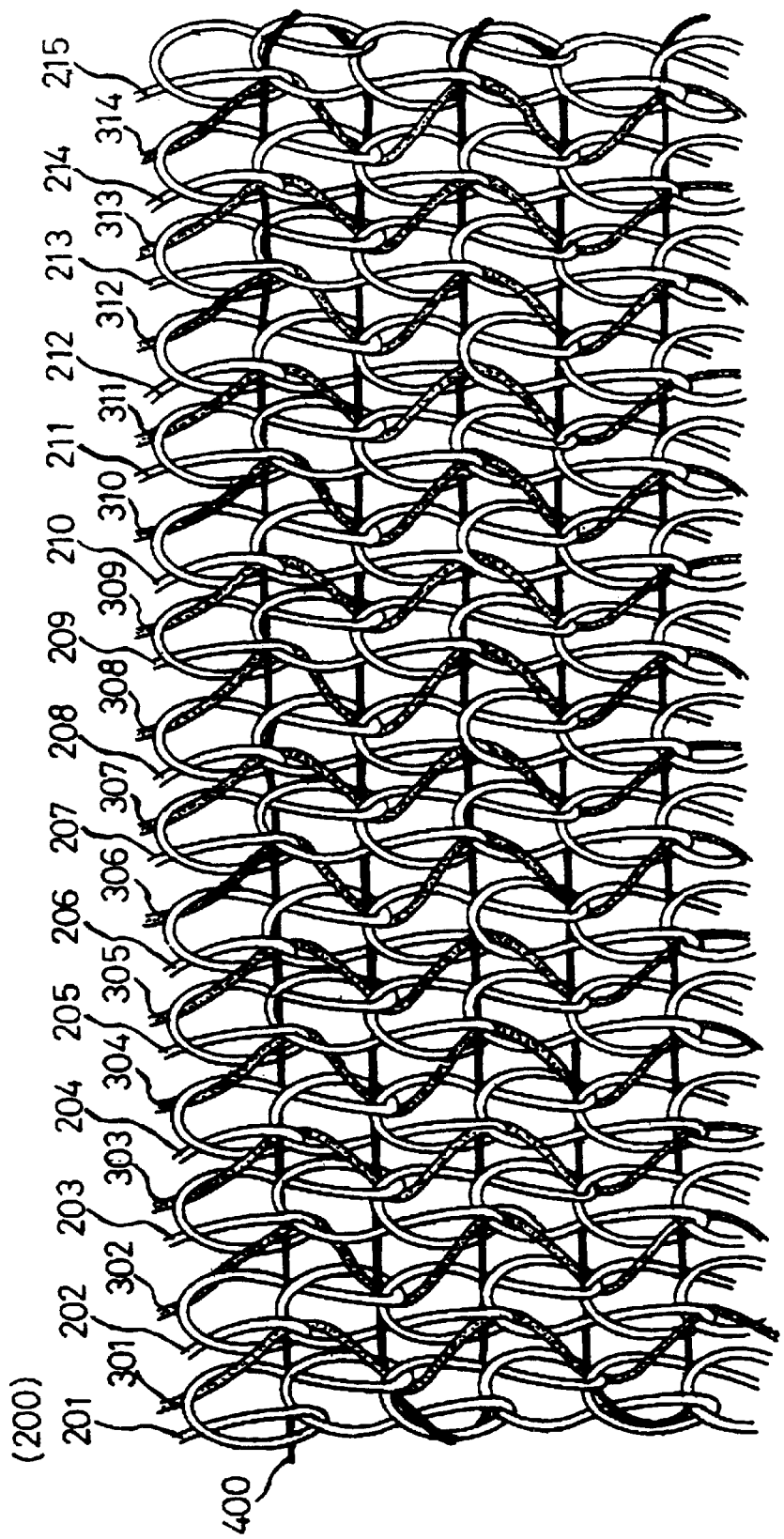

FIG. 4 schematically shows a construction of a woven or knit fabric in a non-expanding portion.

Figure 5:
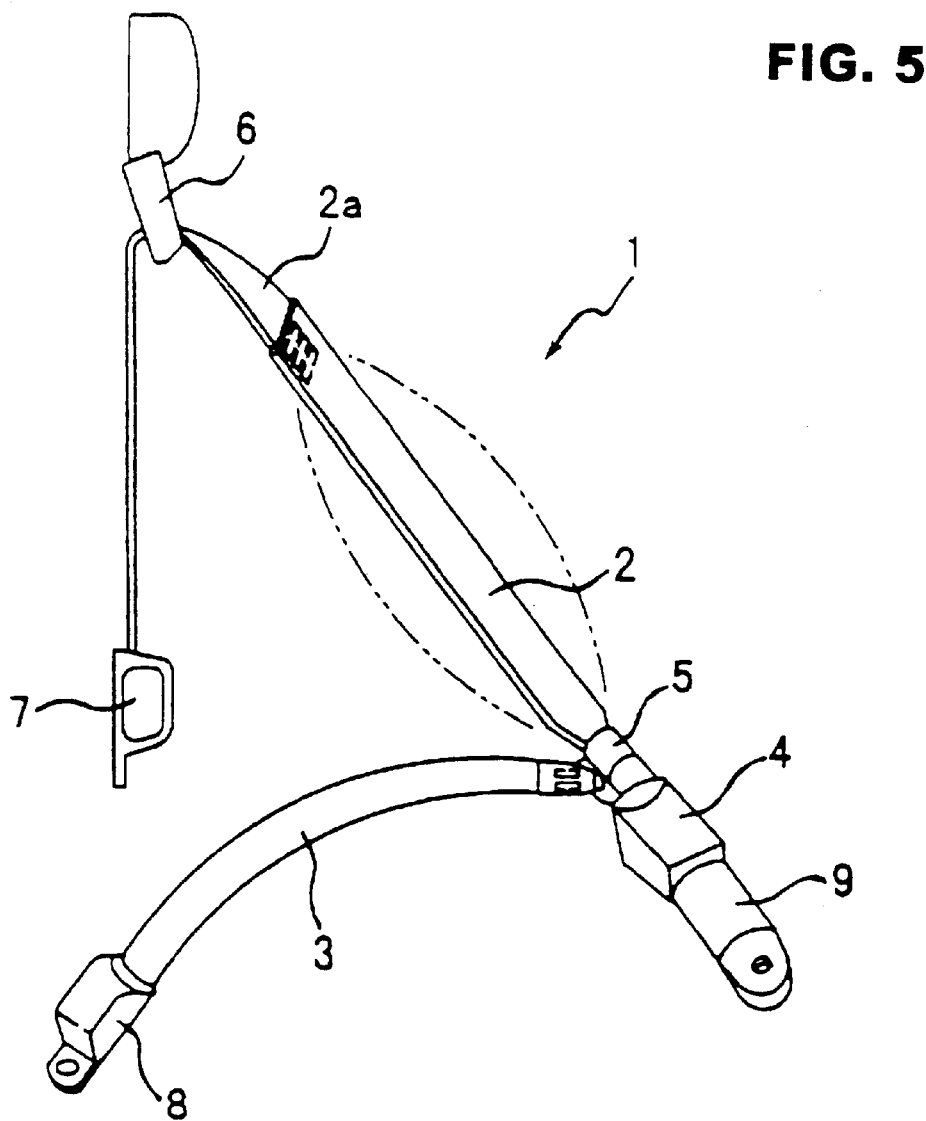

FIG. 5 is a schematic diagram of a conventional air belt apparatus.

DETAILED DESCRIPTION

An embodiment of the present invention will be described below with reference to the accompanying drawings.

An air belt 10 of the air belt apparatus according to the present invention includes a bag 11 and a belt 12, which is constructed of a woven or knit fabric, and which covers the bag 11. The bag 11 is disposed in a manner such that the bag 11 opposes the chest and the abdomen of an occupant who sits on a seat.

The belt 12 is constructed such that the belt 12 flexibly expands in the lateral direction (i.e., across the width of the belt) but does not expand in the longitudinal direction. The belt 12 is processed by heat drawing so that the extension in the longitudinal direction (the direction in which the belt 12 is drawn) does not occur.

The belt 12 includes a sheet-shaped single layer portion 12a, a double layer portion 12c having the shape of a flat, hollow tube, and a middle portion 12b which is disposed between the single layer portion 12a and the double layer portion 12c. The width of the double layer portion 12c is relatively large, and the width of the middle portion 12b is continuously reduced from the double layer portion 12c toward the middle portion 12b. The middle portion 12b has the shape of a flat, tapered tube.

As shown if FIG. 2b, the bag 11 is contained only in the double layer portion 12c. The bag 11 is folded along the longitudinal direction of the air belt apparatus 10 for the required times so that the width of the folded bag 11 is approximately the same as the double layer portion 12c. Both the bag 11 and the belt 12 are connected to the tongue 5 at the ends thereof.

The single layer portion 12a of the belt 12 is inserted through the anchor 6, and is connected to the seat belt retractor (ELR) 7 in a manner such that it can be wounded and extracted.

The belt 12 is manufactured by continuously and integrally forming the single layer portion 12a, the middle portion 12b, and the double layer portion 12c with the woven or knit fabric. More specifically, the belt 12 is not constructed such that a sheet of woven or knit band-shaped fabric is folded in half and is sewn but, rather, is woven or knit in a manner such that the double layer portion 12c and the middle portion 12b are formed as a unitary tube. The double layer portion 12c and the middle portion 12b are constructed by flattening the woven or knit tubular fabric by heat pressing, etc., and is provided with a pair of flat portions S1 and S2.

In the single layer portion 12a, the flat portions S1 and S2 are interwoven or are processed using other techniques so that they are formed as a solid, sheet-shaped band. Accordingly, yarns forming the woven or knit fabric continue from the single layer portion 12a to the middle portion 12b.

Although the woven or knit fabric is preferably formed with chain stitches in the present invention as shown in FIG. 4, tricot stitches may also be used. In the chain stitches, a plurality of yarns (201 to 214) form loops, which are aligned vertically in the figure.

The adjacent lines of the loops are connected by insertion yarns (301 to 314). For example, the insertion yarn 301 is lead through the line of the loops formed by the yarn 201 and the line of the loops formed by the yarn 202, so that the line of the yarn 201 and the line of the yarn 202 are connected to each other.

In FIG. 4, fifteen yarns (201 to 215) and fourteen insertion threads (301 to 314) are shown. In practice, however, a sufficient number of yarns and insertion threads are provided, in accordance with the width of the air belt.

In addition, a weft yarn 400 is inserted through the air belt, and is led back and forth in the lateral direction between one end and the other end. The weft yarn 400 is inserted in intervals corresponding to the size of one loop formed by the yarn 2. The weft yarn 400 is inserted only in the single layer portion 12a. Since the weft 400 is inserted, the single layer portion 12a extends only slightly in the lateral direction (width direction) in practice. Accordingly, the single layer portion 12a is not wound in a meander shape or in a conical shape by the seat belt retractor 7. More specifically, the single layer portion 12a is wound and wrapped over in a flat manner.

Other constructions of this air belt apparatus are the same as the air belt apparatus shown in FIG. 5, and the same components are denoted by the same reference numerals.

This air belt apparatus, which is constructed as described above, is installed in a vehicle in a manner such that the single layer portion 12a of the air belt 10 is inserted through the anchor 6. Similar to the conventional webbing, the single layer portion 12a smoothly slides through the anchor 6, is smoothly wound by the retractor 7, and is smoothly extracted.

The air belt 10 is provided with the middle portion 12b, of which the width is continuously reduced from the double layer portion 12c toward the single layer portion 12a. Thus, the belt does not include a part in which stress is concentrated or a play exists. Accordingly, the durability is improved.

In this air belt apparatus, if the gas generator 9 is activated when the tongue 5 is attached to the buckle 4, the bag 11 contained inside the air belt 10 expands as shown in FIG. 3. At this time, the belt 12 becomes shorter in the longitudinal direction and the air belt 10 closely overlaps the occupant, so that the occupant is reliably protected. As described above, the belt 12 does not extend in the longitudinal direction since the belt 12 is processed by heat drawing. When the bag 11 expands, the stitches of the belt 12 extend in the lateral direction. As a result, the belt 12 is shortened in the longitudinal direction, and the length of the air belt 10 is reduced.

In the above-described embodiment, the air belt 10 is supported by the anchor 6. However, when the retractor is disposed in a pillar or in a seat back, the air belt is inserted through an insertion hole provided at the upper side of the pillar or of the seat back.

As described above, according to the present invention, the air belt itself may be inserted through the anchor or through an air belt insertion hole, and be wound directly by the retractor. In addition, according to the present invention, the air belt smoothly slides inside the anchor, etc., is smoothly wound by the retractor, and is smoothly extracted.

The priority application, Japanese Patent Application No. 2138911 filed May 11, 2 is incorporated by reference herein in its entirety.

Given the disclosure of the present invention, one versed in the art would appreciate that there may be other embodiment and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. An air belt comprising:
   a belt including a hollow expandable portion which is able to expand, and a non-expanding portion; and
   a bag which is contained in the expandable portion of said belt, and in which a gas is injected so as to expand the air belt, wherein said belt is constructed by continuously and integrally forming the expandable portion and the non-expanding portion with a woven or knit fabric, wherein weft yarns are inserted transverse to the longitudinal direction of the belt through the non-expanding portion.

2. The air belt of claim 1 further comprising a gas generator which supplies the gas to said bag contained inside said air belt.

3. The air belt of claim 2, further comprising a tongue to which an end of said air belt is connected and a retractor which winds said air belt from the other end.

4. The air belt of claim 1, wherein the weft yarns are positioned to substantially eliminate expansion of the belt in the lateral direction.

5. An air belt comprising:
   a belt including an expanding portion, a non-expanding portion, and a middle portion positioned between the expanding portion and the non-expanding portion;
   a bag contained in the expanding portion;
   wherein the expanding, non-expanding, and middle portions are integrally formed from a knit fabric having yarns, wherein the yarns forming the expanding portion extend into and form the non-expanding portion, wherein the non-expanding portion is solid, and wherein the middle portion includes two layers of fabric converging together adjacent the non-expanding portion.

6. The air belt of claim 5, wherein said non-expandable portion includes a weft yarn.

7. The air belt of claim 5, wherein the width of the middle portion adjacent the expanding portion is greater than the width of the middle portion adjacent the non-expanding portion.

8. The air belt of claim 5, wherein the belt is configured so that the width of the non-expanding portion is less than the width of the expanding portion.

9. The air belt of claim 5, wherein the non-expanding portion is connected to a retractor.

10. An air belt comprising:
    a belt including a hollow expandable portion which is able to expand, a non-expanding portion, and a middle portion positioned between the expandable portion and the non-expanding portion; and
    a bag which is contained n the expandable portion of said belt, and in which a gas is injected so as to expand the air belt,
    wherein said belt is constructed by continuously and integrally forming the expandable portion, the non expanding portion, and the middle portion with a woven or knit fabric having yarns that continue from the non-expanding portion into the expandable portion, wherein the non-expanding portion is solid, and wherein the middle portion includes two layers of fabric converging together adjacent the non-expanding portion.

11. An air belt comprising:
    a belt including a hollow expandable portion which is able to expand, and a non-expanding portion;
    a bag which is contained in the expandable portion of said belt, and in which a gas is injected so as to expand the air belt; and
    a retractor,
    wherein said belt is constructed by continuously and integrally forming the expandable portion and the non expanding portion with a woven or knit fabric having yarns that continue from the non-expanding portion into the expandable portion,
    wherein the non-expanding portion is adapted to be wound into the retractor, and wherein a weft yarn is inserted through the fabric of the non-expanding portion to prevent the non-expanding portion from being wound into the retractor in a meander shape or in a conical shape.

12. The air belt of claim 11, wherein the weft yarn is inserted only through the non-expanding portion of the belt in a back and forth pattern in the lateral direction between one end and another end of the non-expanding portion.

* * * * *